United States Patent Office 3,583,926
Patented June 8, 1971

3,583,926
STABLE POLYOL COMPOSITIONS AND USE THEREOF IN PREPARATION OF POLYURETHANE FOAM
Leon M. Zwolinski, Orchard Park, and John W. Frink, Buffalo, N.Y., assignors to Allied Chemical Corporation, New York, N.Y.
No Drawing. Filed Feb. 17, 1969, Ser. No. 799,951
Int. Cl. C08g 23/06, 51/54, 53/08
U.S. Cl. 252—182                                7 Claims

ABSTRACT OF THE DISCLOSURE

Production of polyurethane foams by reaction of a polyisocyanate with a mixture of a polyether polyol and sterically hindered aromatic polyamine in the presence of a blowing agent consisting solely of a halogenated hydrocarbon, a tertiary amine catalyst and a divalent lead catalyst. The polyurethane foams are preferably produced by a one-shot method involving reaction of a two package system comprising (1) a polyisocyanate with (2) a storage stable composition of matter comprising (a) a polyether polyol; (b) a sterically hindered aromatic polyamine; (c) a halogenated hydrocarbon blowing agent; (d) a tertiary amine catalyst; and (e) a divalent lead catalyst, said polyol and said diamine being present in such proportion to provide an amine/hydroxyl group ratio of between about 1 and 4.

---

Integral skin polyurethane foam is finding increasing use in the preparation of cushioned articles, such as seat cushions, padded dashboards, automotive sun-visors, and the like. Generally, an integral skin foam article comprises a structure having a resilient cellular core and a densified substantially non-cellular impervious skin. The foam system forms its own continuous skin when poured into a mold, reproducing exactly the surface of the mold.

In the past, the preparation of flexible and semi-rigid polyurethane integral skin cellular articles has commonly involved the use of a three-package system. This three-package system involves the blending of three separate streams, namely, (1) a polyisocyanate; (2) a polyol which may be present together with a diamine curing agent, optionally with other components including catalyst, blowing agent, surfactant, etc. which are substantially non-reactive with the polyol and/or diamine; and (3) an organo-metal catalyst. A desirable feature in the manufacture of such integral skin cellular articles would be to prepare the same from a two-package, i.e. two-stream, system. Such a two-package system would have incorporated in the polyol component the organo-metal catalyst. The advantages of a two-package system would include ease of metering, simplification of metering equipment and the reduction of storage space and packaging and shipping costs for the material to be blended. However, attempts to incorporate an organo-metal catalyst in the polyol package in prior art systems have resulted in a loss of reactivity of the catalyst during storage. Hence, when such stored prior art polyol compositions are employed in the preparation of integral skin polyurethane foam articles, particularly in large masses, the cellular material become crumbly, i.e. easily broken into small pieces or friable.

Accordingly, it is an object of the present invention to provide a storage-stable two-package system for the preparation of integral skin polyurethane foam articles.

It is a further object to provide a process for the preparation of integral skin polyurethane foam articles by a "One-Shot" process employing a reactive polyol composition containing an organo-metal catalyst.

A further object is to provide a non-crumbly flexible, non-rigid polyurethane cellular composition from a stored reactive polyol composition containing an organo-metal catalyst.

These and other objects and advantages of the present invention will become more apparent from the following detailed description and examples.

In accordance with the present invention it has been discovered that integral skin polyurethane foam articles can be prepared from a storage-stable two-package system comprising: (1) a polyisocyanate and (2) a polyol composition comprising a polyether polyol; a sterically hindered aromatic polyamine; a blowing agent consisting solely of a halogenated hydrocarbon; a tertiary amine catalyst; and a divalent lead catalyst, said polyether polyol and aromatic polyamine being present in sufficient proportions to provide an amine/hydroxyl group ratio ($NH_2$/OH ratio) of between about 1:1 and 4:1.

The polyol compositions of the present invention, comprising a polyether polyol, an aromatic polyamine, a halocarbon blowing agent, a tertiary amine catalyst and divalent lead compound catalyst, are surprisingly stable at ordinary room temperatures and may be stored for extended periods of time, for example, seven days or more, with no or substantially little loss of catalyst reactivity. The storage-stable character of the polyol compositions of the present invention permits preparation of integral skin polyurethane foam articles, preferably having a core density between about 3 and 20 pounds per cubic foot, which do not exhibit crumbling, either after curing or after aging. In contrast, in the foaming systems of the prior art, the incorporation of an organo-metallic catalyst in the polyol mixture has resulted in degradation of the catalyst in terms of a substantial loss in reactivity which frequently occurs within a period of a few days. Integral skin polyurethane foam articles produced from stored prior art polyol compositions containing an organo-metallic catalyst other than a divalent lead compound undergo deterioration and degradation as may be evidenced by a crumbly appearance, and in some instances, excessive discoloration; the crumbly nature of such resultant cellular materials adversely affects the resilience of the foam and may lead to sagging and collapse in certain applications.

The integral skin foam articles are prepared, in accordance with the present invention, by a one-shot process involving blending of a polyisocyanate together with the ingredients of the polyol composition, namely, a polyether polyol, an aromatic polyamine, a blowing agent, a tertiary amine catalyst and a divalent lead catalyst. As described above, these ingredients are most conveniently, and hence preferably, brought together as a two package system, the isocyanate comprising one component and the polyol composition, containing the ingredients recited above, as a second component. It is to be understood, of course, that the substantially non-reactive components of the polyol composition, i.e. blowing agent, surfactant, etc., may likewise be introduced as components of the polyisocyanate composition.

In the preparation of the integral skin foam articles in accordance with the present invention the amount of polyisocyanate used is that generally sufficient to react with the active hydrogen groups of the polyol and aromatic polyamine. This amount can be such as to provide a ratio of isocyanate to active hydrogen groups

(NCO:OH+$NH_2$)

within the range of 0.9 to 1.5:1, the preferred

NCO:OH+$NH_2$ ratio being about 1.0:1 to 1.2:1. The component blend is transferred to a mold of the desired shape, preferably preheated and maintained at a temperature of between about 25° and 50° C. and permitted to expand therein to the desired integral skin foam article. The mold may be composed of any suitable material, e.g. aluminum, epoxy, polyurethane or silicon elastomer, polypropylene, etc. and is advantageously precoated with a conventionally employed release agent prior to the molding operation.

The divalent lead compound employed as component of the polyol compositions of the present invention has been found to assert a stabilizing character on such compositions. Although organo-metal compounds have been heretofore employed conventionally as catalysts in polyurethane forming reactions, in accordance with the present invention, it has been found that a particular class of organo-metallic compounds, namely, divalent lead compounds, assert a stabilizing effect on the polyol reaction mixture comprised of a polyether polyol, hindered aromatic polyamine, tertiary amine catalyst and halocarbon blowing agent. The divalent lead compound employed herein is generally present in combined form, e.g. as a salt, complex and the like. For purpose of this description, the divalent lead compounds will be referred to as salts.

Divalent lead salts of carboxylic acids constitute a preferred form of catalyst-stabilizer for the polyol compositions of the present invention. By the term carboxylic acid salt is meant salts of such acids, such as acetic, propionic, butyric, valeric, caproic, caprylic, capric, undecylic, lauric, palmitic, stearic, oleic, linoleic, oxalic, malonic, succinic, glutaric, adipic, azelaic, malic, maleic, fumaric, tartaric, citric, benzoic, phthalic, etc. The carboxylic acids contemplated herein include substituted acids and mixtures of acids capable of forming salts or saltlike compounds with lead. In general, lead salts of monocarboxylic acids are preferred, and lead naphthenate has been found to be particularly preferred.

Other forms of suitable lead compounds employable herein include lead derivatives of beta-diketones, such as acetylacetone; lead complexes such as lead derivatives of alkylacetyl acetates; and phenate salts of lead.

The amount of lead compound which is employed in the polyol composition will, of course, vary in accordance with a number of factors, such as the nature of the precise polymer system used, the properties desired in the ultimate product, the temperature at which the foam is created, the humidity of the atmosphere at the time the foam is made, and the like. The amount of such catalyst-stabilizer will also vary to some degree with the nature of the lead compound used, as well as whether secondary catalysts are employed, and if so, the nature of such secondary catalysts. In general the lead compound catalyst-stabilizer is employed in an amount of at least about 0.01%, by weight, based on the weight of the polyol composition, and is preferably employed in an amount between about 0.02 and 0.20%, by weight, based on the weight of the polyol composition. Large amounts of lead compound, generally above about 2.0%, by weight, based on the weight of the polyol composition, are wasteful and may tend to change the nature of the desired integral skin foam.

The polyether polyols suitable for preparation of the novel polyol compositions of the present invention are conventionally employed in the production of polyurethane cellular materials. These polyether polyols have an average molecular weight of between about 500 and about 6000, an average functionality between about 2 and about 4, and are believed to conform to the formula $$\text{R}-[\text{O}-(\text{CH}_2\text{CHO})_x-\text{A}]_y$$
$$(\text{OA})_z \quad \text{R}_1$$

wherein R is the residue of a polyol exemplified below: $R_1$ is hydrogen or methyl; A is hydrogen, —$CH_2CH_2OH$, or —$CH_2CH_2$—$CH_2$—OH, $CH_2CH(CH_3)OH$, $x$ is an integer from 5 to 50; $y$ is an integer 2 or 3 and $z$ is an integer 0 or 1. Such polyether polyols can be obtained in a known manner by condensation of an alkylene oxide such as ethylene oxide, 1,2-propylene oxide, 1,3-propylene oxide or mixtures thereof, with polyhydric alcohols such as ethylene glycol, propylene glycol, dipropylene glycol, tetramethylene glycol, glycerine, trimethylol propane, sucrose, sorbitol, 1,2,6-hexanetriol, pentaerythritol, trimethylol phenol or mixtures thereof, in the presence of a suitable catalyst or initiator such as a trialkylamine, e.g. trimethylamine, or an inorganic base, e.g. potassium hydroxide, or a metal halide, e.g. boron trifluoride. These products resulting from the condensation of 1,2-propylene oxide with a triol are preferred.

Polyether polyols derived from 1,2-propylene oxide and mixtures of 1,2-propylene oxide with ethylene oxide contain a major proportion of secondary hydroxyl groups and only a minor proportion of the more reactive primary hydroxyls. The reactivity of the polyol can be enhanced by reacting such polyols containing essentially secondary hydroxyl groups with ethylene oxide or 1,3-propylene oxide and thereby obtain a polyether polyol having an increased proportion of primary hydroxyl groups. Such polyols are known in this art as "capped" or "tipped" polyether polyols. Particularly desirable polyether polyols for use in the practice of the present invention are "tipped" polyether polyols containing terminal hydroxy ethylene groups and having a primary hydroxyl content of at least about 20%, and preferably between about 30% and 60%. As is understood to those skilled in this art, the primary hydroxy (OH) content is a percentage based on the total number of OH groups of the polyether polyol. Primary OH groups are those attached to a carbon atom to which two hydrogens are also attached, i.e.

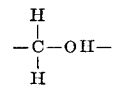

The balance of the OH groups are considered secondary hydroxyl groups.

It is preferred to employ a polyether triol, such as a "tipped" polyoxypropylene triol or a mixture comprising such polyether polyols having an average functionality in the range of about 2.5 and 3.5.

Suitable polyamines which constitute a component of the novel polyol compositions of the present invention include aromatic polyamines of relatively slow reaction rate, i.e. aromatic polyamines substituted in ortho position relative to the amine groups, thereby hindering the reactivity thereof. One class of aromatic primary polyamines employable herein may be represented by the structural formula

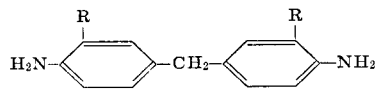

wherein R is selected from the group consisting of halogen, alkyl containing from about 1 to 8 carbon atoms, alkoxy containing from about 1 to 6 carbon atoms. The halogen radicals include chlorine, bromine, fluorine and iodine with chlorine being preferred. Representative preferred arylene diamines of this class include 4,4'-methylenebis(2-chloroaniline)
4,4'-methylenebis(2-bromoaniline)
4,4'-methylenebis(2-iodoaniline)
4,4'-methylenebis(2-fluoroaniline)
4,4'-methylenebis(2-methoxyaniline)
4,4'-methylenebis(2-ethoxy-aniline)
4,4'-methylenebis(2-methylaniline)
4,4'-methylenebis(2-ethylaniline)
4,4'-methylenebis(2-isopropylaniline)
4,4'-methylenebis(2-n-butylaniline)
4,4'-methylenebis(2-n-octylaniline)

Other suitable aromatic polyamines include dihalobenzidine such as dichlorobenzidine; condensation products of 2-chloroaniline and aniline or 2,5-dichloroaniline with formaldehyde, as described in U.S. Pats. 3,412,071 and 3,408,301; and aromatic polyamines obtained by the acid condensation of mixtures of aniline and orthochloroaniline with formaldehyde as described in Spatz et al. application Ser. No. 791,513, entitled "Liquid Aromatic Polyamines," filed Jan. 15, 1969.

The aromatic polyamine and polyether polyol components of the polyol compositions of the present invention are employed in amount sufficient to yield a ratio of amine to hydroxyl groups ($NH_2/OH$ groups) of between about 1:1 and about 4:1 and preferably between about 2:1 and 3:1.

Any of a wide variety of organic polyisocyanates may be employed as reactants with the polyol composition, including aromatic, aliphatic and cycloaliphatic polyisocyanates or mixtures thereof. Liquid diisocyanates are preferred. As examples of this component, the following are mentioned:

m-phenylene diisocyanate
2,4-tolylene diisocyanate
2,6-tolylene diisocyanate
Naphthalene-1,5-diisocyanate
Naphthalene-1,8-diisocyanate
4,4'-methylene-bis-(phenylisocyanate)
4,4'-methylene-bis-(tolylisocyanate)
4,4'-methylene-bis-(cyclohexylisocyanate)
1,6-hexamethylene-diisocyanate A general discussion of isocyanates and their preparation may be found in Saunders et al., Polyurethanes, Chemistry and Technology, Part I, Chemistry, High Polymers, vol. XVI, Interscience Publishers 1962, pages 17–32. Crude polyisocyanate compositions, such as described in U.S. Pat. 3,316,286, as well as modified crude polyisocyanate compositions as disclosed in U.S. Pats. 3,341,462 and 3,359,295, are also contemplated.

The polyisocyanate component employed for reaction with the polyether polyol in accordance with the present invention may likewise be present in the form of an isocyanate terminated prepolymer. In general, the prepolymer technique involves pre-reacting the polyether polyol and isocyanate, optionally in the presence of a triol, to form an isocyanate terminated prepolymer of higher molecular weight. The use of an isocyanate terminated prepolymer for reaction with the polyol composition in accordance with the present invention provides certain advantages in the manufacture of integral skin foam articles over a one-shot system since such prepolymer, being more viscous than the polyisocyanate per se, may be metered to and from dispensing equipment with greater control. The increased viscosity character of the prepolymer tends to reduce pump slippage and renders pressure bouncing less sensitive in such dispensing operations. Other advantages normally obtained by use of the prepolymer technique are likewise realized in production of the integral skin cellular products in accordance with the process of the present invention.

The blowing agent employed herein is a halogenated hydrocarbon and preferably is incorporated as a component of the novel polyol compositions of the present invention. Representative halogenated hydrocarbons which may be employed for this purpose include monofluorotrichloromethane
dichlorodifluoromethane
monochlorotrifluoromethane
trichlorotrifluoroethane
dichlorotrifluoroethane
tetrachlorodifluoroethane
1,1-difluoroethane
methylene chloride and the like. Such halogenated hydrocarbons are generally employed in amounts of between about 1 and 30% and preferably between about 8 and 20%, by weight, based on the total weight of the polyol mixture. It is essential that the halogenated hydrocarbon be the sole blowing agent in the compositions of the present invention. The presence of other blowing agents, especially water, has been found to adversely affect the skin properties of the integral skin foam. It will be understood, however, that water, in minor amounts such as less than about 0.3 percent, based on the weight of the polyol mixture, which may be present as contaminants in the reactants, such as in the polyether polyol, may be tolerated.

In accordance with what is now conventional practice for producing cellular urethane structures, the polyisocyanate-polyol mixture can be reacted in the presence of various adjuvants such as activators, dispersing agents or emulsifiers and the like.

Dispersing agents and/or emulsifiers conventionally used in this art include polyethylenephenolethers, blends of polyalcohol carboxylic acid esters, oil soluble sulfonates, siloxane-oxyalkylene block copolymers and the like. The preferred adjuvants of this group in the present instance are the siloxane-oxyalkylene block copolymers of the general formula:

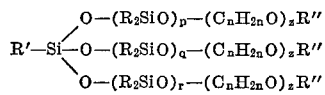

wherein R, R', and R" are $C_{1-18}$ alkyl radicals; $p$, $q$, and $r$ are integers from 2 to 13, and $—(C_nH_{2n}O)_z$ is a polyoxyalkylene block which is preferably a polyoxyethylene block containing from 10 to 50 of each oxyalkylene unit. Products of this type are disclosed in U.S. Pat. 2,834,748 and Belgium Pat. 582,362 and 582,363. Such siloxane-oxyalkylene block copolymers are available commercially, one such product being offered under the trade designation of "Silicone-L-520," in which above general formula: $R=CH_3$, $R'=C_2H_5$, $R''=C_4H_9$, $p=q=r=7$ and the block $—(C_nH_{2n})_z$ is a polyoxyethylene-polyoxypropylene block containing about 50 units of each polyoxyalkylene moiety.

It is also essential in preparation of the integral skin cellular articles of the present invention to include a tertiary amine catalyst. Any suitable tertiary amine may be used including, for example, aliphatic, cycloaliphatic, araliphatic and like tertiary amines. In general, the tertiary amines employed herein may be substituted by linear or branched, aliphatic, cycloaliphatic or araliphatic hydrocarbon radicals which may also contain hetero atoms such as oxygen, sulphur or nitrogen. Specific examples of substituents attached to the nitrogen atom of the tertiary amine include, for example, methyl, ethyl, propyl, butyl, hexyl, octyl, lauryl, stearyl, cyclohexyl, benzyl, isopropyl, propenyl, butene-2-yl, $CH_3—CH_2—S—CH_2—$,

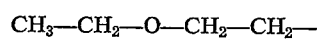

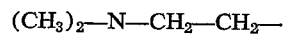

and the like. Tertiary amines containing hydroxy groups as well as additional products of low or relatively high molecular weight obtained from primary and/or secondary monoamines or polyamines and alkyl oxides such as ethylene oxide, propylene oxide, 1,2- or 2,3-butylene oxide, styrene oxide, epichlorohydrin and the like may also be used. Illustrative examples of tertiary amines employable herein include triethylenediamine
triethylamine
dimethylbutylamine
dimethyl-(3-ethoxypropyl)amine
dimethylcyclohexyl amine
dimethylstearyl amine
diethylbutyl amine
tri-n-propyl amine
tri-n-butyl amine
tetramethylethylene diamine
tetramethyltetramethylene diamine
tetramethylhexylmethylene diamine
methyl morpholine
ethyl morpholine
dimethyl piperazine
N-methyl-N-(2-dimethylaminoethyl)-piperazine
pyridine
benzylpyridine
dimethylethanolamine
diethylethanolamine
N-methyl-diethanolamine
N-butyl-diethanolamine
triethanolamine Mixtures of the aforementioned and like amines are also contemplated herein. As indicated above with respect to the amount of lead compound employed in accordance with the present invention, the amount of tertiary amine catalyst may also be greatly varied and in general will be employed in an amount between about 0.05 and 5%, by weight, based on the weight of the polyol composition of the present invention.

If desired, conventional colorants, pigments, fillers and the like may likewise be incorporated in the foam mixture preferably in the polyol mixture in accordance with conventional practice in the polyurethane foam art.

The following examples are illustrative of the present invention but are not considered as limiting in scope in any manner whatever. In the examples all parts and percentages are by weight and all temperatures are in degrees centigrade.

EXAMPLE 1

A molded foam article was prepared as follows: A one-shot machine dispensed integral skin forming composition was mixed as follows:

Stream 1

| | Parts by weight |
|---|---|
| Polyether triol (oxypropylated trimethylolpropane adduct with end groups terminated with ethylene oxide; molecular weight 4500) | 100 |
| Dimethylpolysiloxane fluid, 50 csk. | 0.8 |
| 33% solution of 1,4-diazabicyclo-(2,2,2)-octane in dipropylene glycol | 0.8 |
| Aromatic diamine (LD813—a commercially available aniline-chloroanilineformaldehyde acid condensation product—E. I. du Pont | 20.0 |
| Lead naphthenate (24% lead in mineral spirits) | 0.04 |
| Trichloromonofluoromethane | 20 |

Stream 2

| | Parts by weight |
|---|---|
| Tolylene diisocyanate (80/20 mixture of the 2,4/2,6 isomers, 0.009% acidity) | 21.3 |

The reaction mixture was poured into a cast aluminum mold shaped in the form of an automotive bucket seat, preheated to 40°, which was pre-coated with a water-soluble wax release agent (Chem Trend P–5–CL, Chem Trend Corp., Howell, Mich.).

On cooling and removal from the mold, the resultant foam seat had a substantially impervious densified skin layer approximately 1/32" thick, and an inner core foam density of about 4.7 lbs./cu. ft.

EXAMPLE 2

A molded foam article was prepared by mixing 27.6 parts by weight of a prepolymer which is the reaction product of 560 parts of a 4500 molecular weight primary hydroxyl group tipped polyoxypropylene triol and 2,020 parts of a 80/20 mixture of the 2,4/2,6 isomers of tolylene diisocyanate (0.01% acidity) with the following polyol composition:

| | Parts by weight |
|---|---|
| Polyether triol (oxypropylated trimethylolpropane adduct with end groups terminated with ethylene oxide; molecular weight 4500) | 95 |
| Aromatic diamine (LD813) | 20 |
| Dimethylpolysiloxane fluid, 50 csk. | 0.8 |
| 33% solution of 1,4-diazabicyclo-(2,2,2)-octane in dipropylene glycol | 0.6 |
| Lead naphthenate (24% lead in mineral spirits) | 0.04 |
| Carbon black (Sterling MT) | 0.5 |
| Trichloromonofluoromethane | 15 |

The molded foam exhibited the following physical properties:

| | |
|---|---|
| Density (lbs./cu. ft.) of the core | 7.5 |
| Indentation load (lbs./sq. in.) ½" x 2" indentor, 25% deflection | 22.7 |
| Indentation load (lbs./sq. in.) ½" x 2" indentor, with skin 50% deflection | 51.7 |
| Tear strength (lbs./cu. in.) core foam | 5.9 |
| Compression set (percent), 50% compression | 17.9 |

EXAMPLE 3

The retention of reactivity in the polyol mixtures of the persent invention was demonstrated as follows: A polyol mixture was prepared having the following composition:

(A)

| | Parts by weight |
|---|---|
| Polyether triol (oxypropylated trimethylolpropane adduct with end groups terminated with ethylene oxide; molecular weight 4500) | 82.4 |
| Aromatic diamine (LD813) | 40.0 |
| 33% solution of 1,4-diazabicyclo-(2,2,2)-octane in dipropylene glycol | 2.0 |
| Dimethylpolysiloxane fluid, 50 csk. | 1.0 |
| Lead naphthenate (24% lead in mineral spirits) | 0.1 |
| Trichloromonofluoromethane | 40.0 |

(B)

For purposes of comparison, another polyol mixture was prepared, having the same composition as above, except that in place of lead naphthenate, there was substituted 0.2 part of dibutyl tin dilaurate.

The polyol mixtures were stored at room temperature (approximately 25 degrees). At various intervals, the mixtures were tested for catalyst reactivity by reacting a sample of the polyol mixture with an isocyanate-terminated prepolymer in a proportion of about 1.04 parts of polyol mixture per part of prepolymer. The prepolymer employed was the reaction product of 776 parts of an 80/20% mixture of 2,4/2,6 isomers of tolylene diisocyanate and 2,224 parts of a 4,500 molecular weight primary hydroxyl tipped polyoxypropylene triol. The reactivity of the mixture was determined by pouring the mixed reactants into an open top mold and measuring the cream time, rise time and tack-free time of the foam produced by the reaction. The cream, rise and tack-free times are defined as follows:

Cream time—The time for the initial blending of the isocyanate with the polyol mixture until the start of gas evolution, as evidenced by the first appearance of opalescence in the blend.

Rise time—The time from the initial blending of the isocyanate with the polyol mixture until the foaming mass has risen to its fullest height under a free rise condition, i.e. in an open-top mold.

Tack-free time—The time from the initial blending of the isocyanate with the polyol mixture until the free-rise surface of the foamed mass is dry to the touch, i.e. no foam adheres to a finger touching the surface.

| | Change during storage | |
|---|---|---|
| | A | B |
| Cream time | No change after 3 months. | 33% increase after 3 months. |
| Rise time | 6% increase after 3 months. | 17% increase after 3 months. |
| Tack-free time | No increase after 2 weeks. | Increased 50% after 2 weeks. |

The above tests indicate no appreciable loss in catalytic reactivity for mixture A (containing lead naphthenate catalyst) during the storage period, while mixture B (containing dibutyltin dilaurate catalyst) exhibited a substantial drop in reactivity during the same period.

In addition to the time factors noted above, it was observed that after storage expansion of the foams prepared from mixture B, was considerably less than the foams prepared from mixture A, and the quality of the foams prepared from B was considerably poorer. Furthermore, foams prepared after the storage period, from mixture B were crumbly and lacking in strength even after prolonged standing, whereas foams prepared from mixture A developed strength and toughness rapidly on standing.

We claim:
1. A composition of matter which is stable against loss of reactivity for a period of at least two weeks consisting essentially of (a) a polyether polyol; (b) a sterically hindered aromatic polyamine; (c) about 1–30 weight percent of a blowing agent consisting solely of a halogenated hydrocarbon; (d) about 0.05–5 weight percent of a tertiary amine catalyst; and (e) at least 0.01 weight percent of a divalent lead salt of a carboxylic acid, said polyol and said diamine being present in such proportion to provide an amine/hydroxyl group ratio of between about 1:1 and 4:1.
2. The composition as defined in claim 1 wherein the divalent lead salt of a carboxylic acid is lead naphthenate.
3. The composition as defined in claim 2 wherein said lead-naphthenate is present in an amount at least about 0.01% by weight, based on the weight of the composition.
4. The composition as defined in claim 2 wherein said polyamine is an aromatic primary diamine corresponding to the formula:

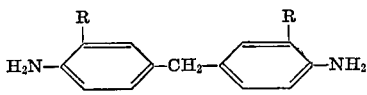

wherein R is selected from the group consisting of halogen, alkyl containing from about 1 to 8 carbon atoms, alkoxy containing from about 1 to 6 carbon atoms.
5. The composition as defined in claim 2 wherein said aromatic polyamine is a mixture obtained by the acid condensation of aniline and orthochloroaniline with formaldehyde.
6. The composition as defined in claim 2 wherein said polyether polyol is a polyether polyol containing terminal hydroxy ethylene groups and has a primary hydroxyl group content of at least about 20%.
7. The composition as defined in claim 2 wherein (a) said polyether polyol is a polyoxpropylene triol containing terminal hydroxy ethylene groups having a primary hydroxyl group content between about 30% to about 60% and an average functionality in the range of about 2.5 and 3.5; (b) said aromatic polyamine is a mixture obtained by the acid condensation of aniline and orthochloroaniline with formaldehyde; (c) said blowing agent is present in an amount between about 8 and 20%, by weight, based on the weight of the composition; (d) said tertiary amine catalyst is triethylene diamine and (e) said lead naphthenate is present in an amount between about 0.02 and 0.2%, by weight, based on the weight of the composition, said polyol and said polyamine being present in sufficient proportions to provide a ratio of amine to hydroxyl groups of between about 1:1 and 2:1.

References Cited
UNITED STATES PATENTS

| | | | |
|---|---|---|---|
| 3,385,807 | 5/1968 | Herdlein et al. | 260—2.5 |
| 3,412,071 | 11/1968 | Sundholm | 260—75 |
| 3,473,951 | 10/1969 | De Rossi et al. | 117—72 |
| 3,476,933 | 11/1969 | Mendlesohn | 260—2.5 |

FOREIGN PATENTS

| | | | |
|---|---|---|---|
| 901,056 | 7/1962 | Great Britain | 260—2.5 |
| 997,369 | 7/1965 | Great Britain | 260—77.5 |
| 1,033,928 | 6/1966 | Great Britain | 260—77.5 |
| 1,120,425 | 7/1968 | Great Britain | 260—2.5 |
| 1,124,827 | 8/1968 | Great Britain | 260—2.5 |
| 1,160,041 | 7/1969 | Great Britain | 260—2.5 |
| 1,160,042 | 7/1969 | Great Britain | 260—2.5 |

OTHER REFERENCES
Dutch patent specification publication No. 288,185 (pages 1–15), dated Mar. 10, 1965.

DONALD E. CZAJA, Primary Examiner

H. S. COCKERAM, Assistant Examiner

U.S. Cl. X.R.

260—2.5AM, 18TN, 77.5AM